United States Patent
Wen et al.

(10) Patent No.: US 11,969,891 B2
(45) Date of Patent: Apr. 30, 2024

(54) 4D PRINTED GRIPPER WITH FLEXIBLE FINGER JOINTS AND TRAJECTORY TRACKING CONTROL METHOD THEREOF

(71) Applicant: YANSHAN UNIVERSITY, Hebei (CN)

(72) Inventors: Yintang Wen, Hebei (CN); Haiying Yao, Hebei (CN); Xiaoyuan Luo, Hebei (CN); Yuyan Zhang, Hebei (CN); Xi Liang, Hebei (CN); Bo Liang, Hebei (CN)

(73) Assignee: YANSHAN UNIVERSITY, Hebei (CN)

( * ) Notice: Subject to any disclaimer, the term of this patent is extended or adjusted under 35 U.S.C. 154(b) by 466 days.

(21) Appl. No.: 17/273,267

(22) PCT Filed: Apr. 13, 2020

(86) PCT No.: PCT/CN2020/084391
§ 371 (c)(1),
(2) Date: Mar. 3, 2021

(87) PCT Pub. No.: WO2021/184461
PCT Pub. Date: Sep. 23, 2021

(65) Prior Publication Data
US 2022/0126442 A1    Apr. 28, 2022

(30) Foreign Application Priority Data
Mar. 20, 2020  (CN) .......................... 202010201205.1

(51) Int. Cl.
B25J 9/16        (2006.01)
B25J 9/00        (2006.01)
(Continued)

(52) U.S. Cl.
CPC ........... B25J 9/1612 (2013.01); B25J 9/0012 (2013.01); B25J 9/163 (2013.01); B25J 9/1646 (2013.01);
(Continued)

(58) Field of Classification Search
CPC ........ B25J 9/1612; B25J 9/0012; B25J 9/163; B25J 9/1646; B25J 9/1653; B25J 9/1664;
(Continued)

(56) References Cited

U.S. PATENT DOCUMENTS

| 11,590,006 | B2* | 2/2023 | Xiao | ................. A61F 2/586 |
| 2021/0165486 | A1* | 6/2021 | Erivantcev | .............. G06F 3/014 |

(Continued)

FOREIGN PATENT DOCUMENTS

| CN | 104035337 A | 9/2014 | |
| CN | 105816299 A * | 8/2016 | .......... A61H 1/0274 |

(Continued)

OTHER PUBLICATIONS

CN-105816299-A Translation (Year: 2016).*
(Continued)

Primary Examiner — Jason Holloway
Assistant Examiner — Kyle T Johnson
(74) Attorney, Agent, or Firm — Neugeboren O'Dowd PC (57) ABSTRACT

The present disclosure relates to a 4D printed gripper with flexible finger joints and a trajectory tracking control method thereof. The 4D printed gripper with flexible finger joints includes: a palm unit and five finger units connected to the palm unit, where each finger unit includes two flexible finger joints and two phalanges; each flexible finger joint is divided into one upper layer and one lower layer of liquid crystal elastomer (LCE), and each LCE is used to implement a bidirectional bending movement of the finger unit. The present disclosure can precisely control the gripper with flexible finger joints.

20 Claims, 5 Drawing Sheets

(51) Int. Cl.
  B25J 15/00 (2006.01)
  B25J 15/12 (2006.01)
  B33Y 80/00 (2015.01)
(52) U.S. Cl.
  CPC ........... B25J 9/1653 (2013.01); B25J 9/1664 (2013.01); B25J 15/0009 (2013.01); B25J 15/12 (2013.01); B33Y 80/00 (2014.12)
(58) Field of Classification Search
  CPC ...... B25J 15/0009; B25J 15/12; B25J 9/1605; B33Y 80/00; B33Y 50/02
  See application file for complete search history.

(56) References Cited

U.S. PATENT DOCUMENTS

2021/0268663 A1* 9/2021 Gu ..................... B25J 19/0029
2022/0126442 A1* 4/2022 Wen ..................... B33Y 50/02

FOREIGN PATENT DOCUMENTS

| CN | 106309083 | A |   | 1/2017 |  |
|----|-----------|---|---|--------|--|
| CN | 106956283 | A | * | 7/2017 | .......... B25J 15/0009 |
| CN | 108132602 | A |   | 6/2018 |  |
| CN | 109249415 | A |   | 1/2019 |  |
| CN | 109986594 | A |   | 7/2019 |  |
| CN | 110142969 | A |   | 8/2019 |  |
| CN | 112976025 | A | * | 6/2021 | .......... B25J 15/0009 |
| WO | WO-2019194748 | A1 | * | 10/2019 |  |

OTHER PUBLICATIONS

CN-106956283-A translation (Year: 2017).*
CN-112976025-A translation (Year: 2021).*
4D Printing of Hygroscopic Liquid Crystal Elastomers (Year: 2021).*
Soft Actuators and Robotic Devices (Year: 2022).*
ISA/CN, "International Search Report Regarding International Application No. PCT/CN2020/084391", Dec. 14, 2020, p. 4, Published in: CN.
ISA/CN, "Translation of International Search Report Regarding International Application No. PCT/CN2020/084391", Dec. 14, 2020, p. 4, Published in: CN.

* cited by examiner

4D PRINTED GRIPPER WITH FLEXIBLE FINGER JOINTS AND TRAJECTORY TRACKING CONTROL METHOD THEREOF

CROSS REFERENCE TO RELATED APPLICATION

This application is a National Stage of International Application No. PCT/2020/084391 filed on Apr. 13, 2020 which claims priority to Chinese Patent Application No. 202010201205.1, filed with the China National Intellectual Property Administration (CNIPA) on Mar. 20, 2020 and entitled "4D PRINTED GRIPPER WITH FLEXIBLE FINGER JOINTS AND TRAJECTORY TRACKING CONTROL METHOD THEREOF", which is incorporated herein by reference in its entirety.

TECHNICAL FIELD

The present disclosure relates to the field of smart material-based 4D printing, and in particular, to a 4D printed gripper with flexible finger joints and a trajectory tracking control method thereof.

BACKGROUND

In the past two decades, flexible robots have become an increasingly attractive field of engineering research. This is because new robot application requires lighter machines and less energy. A flexible robot is generally made of soft materials, which can better adapt to various environments. Compared with traditional heavy and complex rigid manipulators and pneumatic soft hands, a 4D printed gripper with flexible finger joints has more advantages, especially its continuous reversible deformation and structure-performance-function design.

4D printing is to use a smart "programmable substance" as a printing material to print out a three-dimensional object through 3D printing. The object can change its shape or structure over time under predetermined external stimuli. Through the design of smart material structures, the 4D printed gripper with flexible finger joints can perform controllable actions under external stimuli. The increasingly sophisticated design of the smart material structures and the ever-improving control methods enable 4D printing-based flexible robots to gradually replace some mechanical components of traditional robots.

Nowadays, sliding mode control has a relatively complete theoretical system, and has been widely used in manipulator systems to enable a controlled system to run according to sliding mode rules. However, there is uncertainty in the design process of a model of a gripper with flexible finger joints. One of the outstanding advantages of sliding mode control is to make a system less sensitive to model errors of a controlled object, object parameter changes, and external interference, thereby overcoming the uncertainty of the system.

Existing patents related to this field include Chinese Patent Publication No. CN106309083A, entitled "EMG-CONTROLLED PNEUMATIC SOFT REHABILITATION MANIPULATOR", disclosing an EMG-controlled pneumatic soft rehabilitation manipulator, where each finger is a hollow cavity structure composed of soft materials, and the bending and stretching of the fingers are realized through pneumatic driving. However, there is not a precise control algorithm, and in the pneumatic driving mode, the bending and stretching of materials are unrelated to external stimuli. In contrast, 4D printing structure materials adopt a self-driving mode, in which the materials produce bending or stretching changes under external stimuli, that is, can adaptively deform as the environment changes, with good flexibility and efficiency. The Chinese patent publication No. CN110142969A, entitled "4D PRINTING MATERIAL GRABBING AND RELEASING MECHANISM AND METHOD", discloses a 4D printing material grabbing and releasing mechanism and method. The grabbing and releasing mechanism includes a 4D printing drive control structure and a support structure. Electrodes are connected on a surface of a 4D printing material film, and the electrodes are used to control a bending degree of the material to implement grabbing of different materials. However, this reference only realizes simple bending behavior, and does not establish a model for precise control.

SUMMARY

The present disclosure aims to provide a 4D printed gripper with flexible finger joints and a trajectory tracking control method thereof, which can implement precise control of the gripper with flexible finger joints.

To achieve the above objective, the present disclosure provides the following solutions:

A 4D printed gripper with flexible finger joints is provided, including: a palm unit and five finger units connected to the palm unit, where each finger unit includes two flexible finger joints and two phalanges; each flexible finger joint is divided into one upper layer and one lower layer of liquid crystal elastomer (LCE), and each LCE is used to implement a bidirectional bending movement of the finger unit.

Optionally, the palm unit is made by 3D printing.

Optionally, printing materials of the flexible finger joints of all finger units are the same, and printing materials of the phalanges of all finger units are the same, the flexible finger joints are separately connected to the palm unit and the phalanges in a smooth manner, the phalanges are made of a fixed hard material, and the hard material moves with the bending of the flexible finger joints.

Optionally, each phalange is made of a resin material by 3D printing; and each flexible finger joint is made of a 4D printed LCE composite material.

Optionally, a bending curvature detection sensor and a polyimide electrothermal film are attached to a surface of each LCE; the bending curvature detection sensor is used to monitor a bending angle of the flexible finger joint; and when an electric current is applied, the polyimide electrothermal film generates heat, so that the LCE is heated and deformed.

Optionally, when the flexible finger joint is energized and heated externally, one layer of LCE contracts, the other layer of LCE expands, and the finger unit bends to a contracted side; and when the power is off, the finger unit slowly returns to an original state.

A trajectory tracking control method for a 4D printed gripper with flexible finger joints is provided, including:
  establishing a dynamic model of a finger unit;
  designing a sliding mode control rate according to the dynamic model and Lyapunov function stability theory; and
  controlling a bending angle of each flexible finger joint based on the sliding mode control rate to implement trajectory tracking control.

Optionally, the establishing a dynamic model of a finger unit specifically includes:

establishing a global reference coordinate system along a horizontal plane on which a metacarpal bone of a palm unit is located and a direction perpendicular to the horizontal plane, and constructing a dynamic model of a phalange;

establishing a natural coordinate system along a neutral curve of each flexible finger joint, and constructing a dynamic model of the flexible finger joint;

determining a coordinate transformation matrix between the global reference coordinate system and the natural coordinate system;

determining a position expression of each phalange and a velocity expression of each phalange based on the global reference coordinate system;

obtaining a position expression of a corresponding flexible finger joint and a velocity expression of the corresponding flexible finger joint according to the coordinate transformation matrix, the position expression of each phalange, and the velocity expression of each phalange;

determining kinetic energy $E_k$ and potential energy $E_p$ corresponding to each finger unit according to the position expression of each flexible finger joint and the velocity expression of the corresponding flexible finger joint;

calculating a Laplace function of each finger unit based on the kinetic energy and the potential energy corresponding to each finger unit by using a formula $L=E_k-E_p$; and obtaining a dynamic model of each finger unit with the flexible finger joints according to the Laplace function of the finger unit.

Optionally, the obtaining a dynamic model of each finger unit with the flexible finger joints according to the Laplace function of the finger unit specifically includes:

obtaining a motion equation of each finger unit according to the Laplace function of each finger unit by using a Lagrangian formula; and obtaining the dynamic model of each finger unit with flexible finger joints according to the motion equation of each finger unit.

According to specific embodiments of the present disclosure, the present disclosure discloses the following technical effects:

1. The gripper with flexible finger joints designed in the present disclosure is completely made by 3D or 4D printing technology and has low production costs. It can be designed with a great degree of freedom, and fully shows the advantages of the additive manufacturing technology.

2. The present disclosure establishes separate models for the flexible finger joints and phalanges, which overcomes the problem of difficult modeling of a flexible robot.

3. The present disclosure applies a Lagrangian kinematics equation for the gripper with flexible finger joints, and further designs a trajectory tracking control algorithm based on sliding mode control, which implements precise control for a gripper with flexible finger joints based on smart material 4D printing, and lays a foundation for the precise bending and grasping control of the gripper with flexible finger joints.

BRIEF DESCRIPTION OF THE DRAWINGS

The present disclosure will be explained in detail with reference to the accompanying drawings.

DETAILED DESCRIPTION

The technical solutions in embodiments of the present disclosure will be described in detail with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative work shall fall within the protection scope of the present disclosure.

The present disclosure aims to provide a 4D printed gripper with flexible finger joints and a trajectory tracking control method thereof, which can implement precise control of the gripper with flexible finger joints.

To make the objectives, features, and advantages of the present disclosure more obvious and comprehensive, the following further describes in detail the present disclosure with reference to the accompanying drawings and specific implementations.

Figure 1:
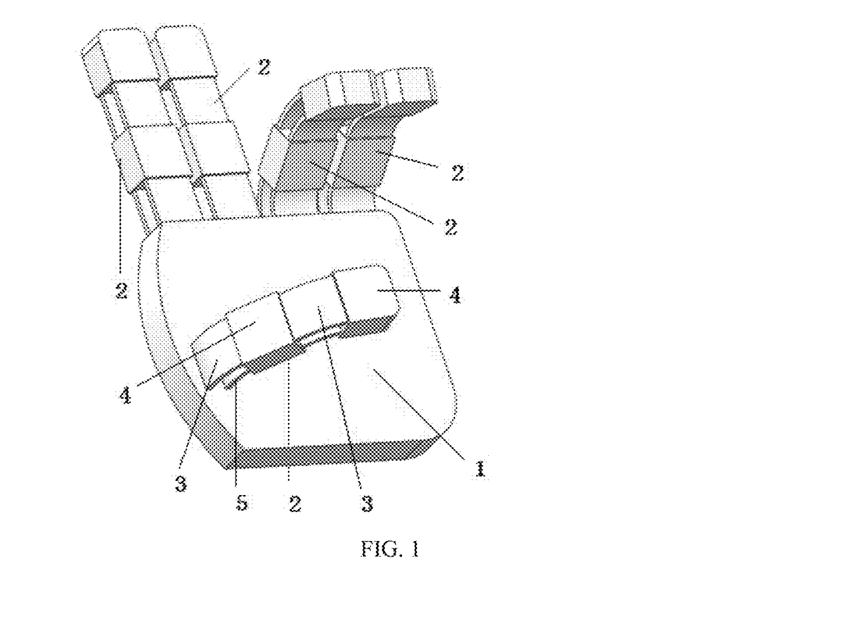
FIG. 1 is a perspective view of a 4D printed gripper with flexible finger joints according to the present disclosure.

FIG. 1 is a perspective view of a 4D printed gripper with flexible finger joints according to the present disclosure. As shown in FIG. 1, a 4D printed gripper with flexible finger joints includes: a palm unit 1 and five finger units 2 connected to the palm unit 1. Each finger unit 2 includes two flexible finger joints 3 and two phalanges 4, and all phalanges 4 are smoothly connected to the flexible finger joints 3, without deformation of themselves, and will move with the bending of the flexible finger joints 3. Each flexible finger joint 3 is divided into one upper layer and one lower layer of liquid crystal elastomer (LCE) 5. Each LCE 5 is used to implement a bidirectional bending movement of the finger unit 2.

The palm unit 1 is made by 3D printing. Printing materials of the flexible finger joints 3 of all finger units 2 are the same, and printing materials of the phalanges 4 of all finger units 2 are the same. The flexible finger joints 3 are separately connected to the palm unit 1 and the phalanges 4 in a smooth manner, the phalanges 4 are made of a fixed hard material, and the hard material moves with the bending of the flexible finger joints 3. Each phalange 4 is made of a resin material by 3D printing; and each flexible finger joint 3 is made of a 4D printed LCE 5 composite material.

Each flexible finger joint 3 is divided into one upper layer and one lower layer of LCE 5, and a bending curvature detection sensor and a polyimide electrothermal film are attached to a surface of each layer of LCE 5. The bending curvature detection sensor is used to monitor a bending angle of the flexible finger joint 3. When an electric current is applied, the polyimide electrothermal film generates heat, so that the LCE 5 is heated and deformed.

When the flexible finger joint 3 is energized and heated externally, one layer of LCE 5 contracts, the other layer of LCE 5 expands, and the finger unit 2 bends to a contracted side. When the power is off, the finger unit 2 slowly returns to an original state.

Figure 2:
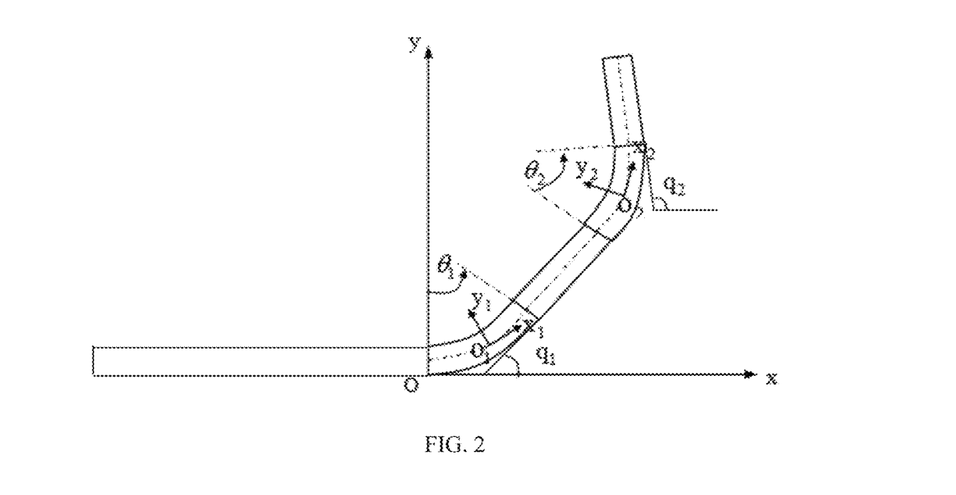
FIG. 2 is a schematic diagram of a coordinate system established for each finger unit according to the present disclosure.

FIG. 2 is a schematic diagram of a coordinate system established for each finger unit 2 according to the present disclosure. $\theta_1$ and $\theta_2$ are bending angles of two flexible finger joints 3, and $q_1$ and $q_2$ are rotation angles of two phalanges 4.

Figure 3:
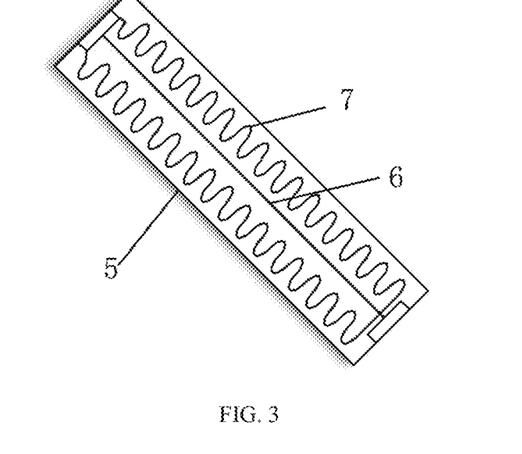
FIG. 3 is a schematic diagram of a flexible finger joint according to the present disclosure.

FIG. 3 is a schematic diagram of a flexible finger joint according to the present disclosure Referring to FIG. 1 and FIG. 3, the flexible finger joint 3 is made of one upper layer and one lower layer of LCE 5 composite smart materials. A bending curvature detection sensor 6 and a polyimide electrothermal film 7 are attached on a surface of the LCE 5. When power or heating is applied, the flexible finger joint 3 bends. The palm unit 1 is used as a base, and a gripper system with the flexible finger joints 3 can bend flexibly with multiple degrees of freedom, which is convenient for grasping objects and bending like a "human hand".

Figure 4:
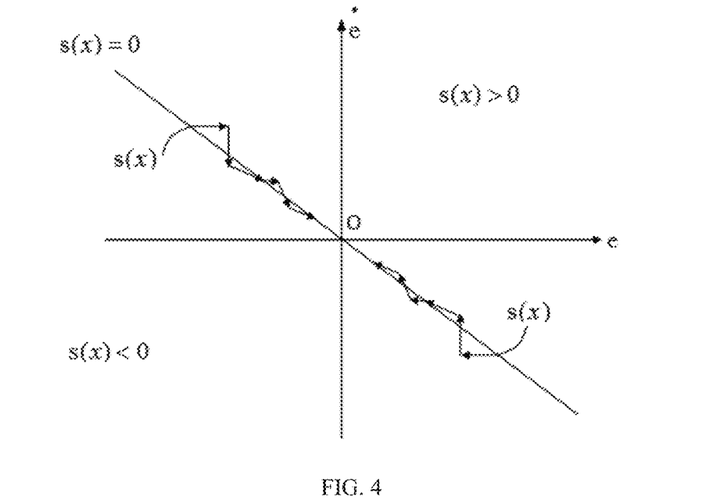
FIG. 4 is a basic principle diagram of sliding mode control according to the present disclosure.

FIG. 4 is a basic principle diagram of sliding mode control according to the present disclosure. $s(x)=0$ is a defined sliding mode surface. Sliding mode control can be described as follows: under the action of a controller, a system continuously approaches the sliding mode surface $s(x)=0$ from a space position far away from the sliding mode surface; once reaching a position of the sliding mode surface, the system slides to an equilibrium point along a designed sliding mode surface direction, so that the system gradually stabilizes at a position of the equilibrium point O finally.

Figure 5:
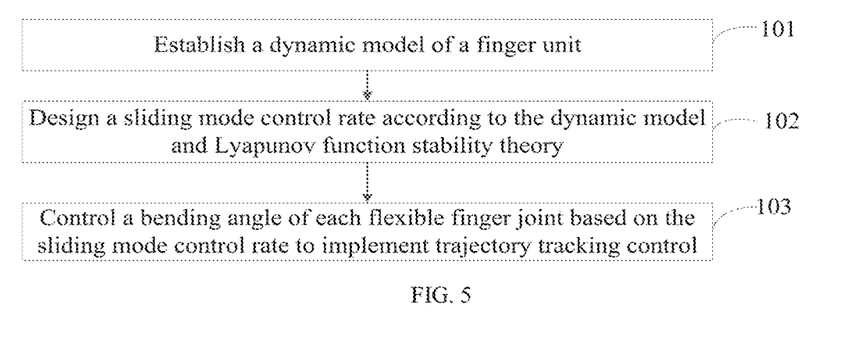
FIG. 5 is a flowchart of a trajectory tracking control method for a 4D printed gripper with flexible finger joints according to the present disclosure.

FIG. 5 is a flowchart of a trajectory tracking control method for a 4D printed gripper with flexible finger joints according to the present disclosure. As shown in FIG. 5, the trajectory tracking control method for a 4D printed gripper with flexible finger joints includes the following steps.

Figure 5A:
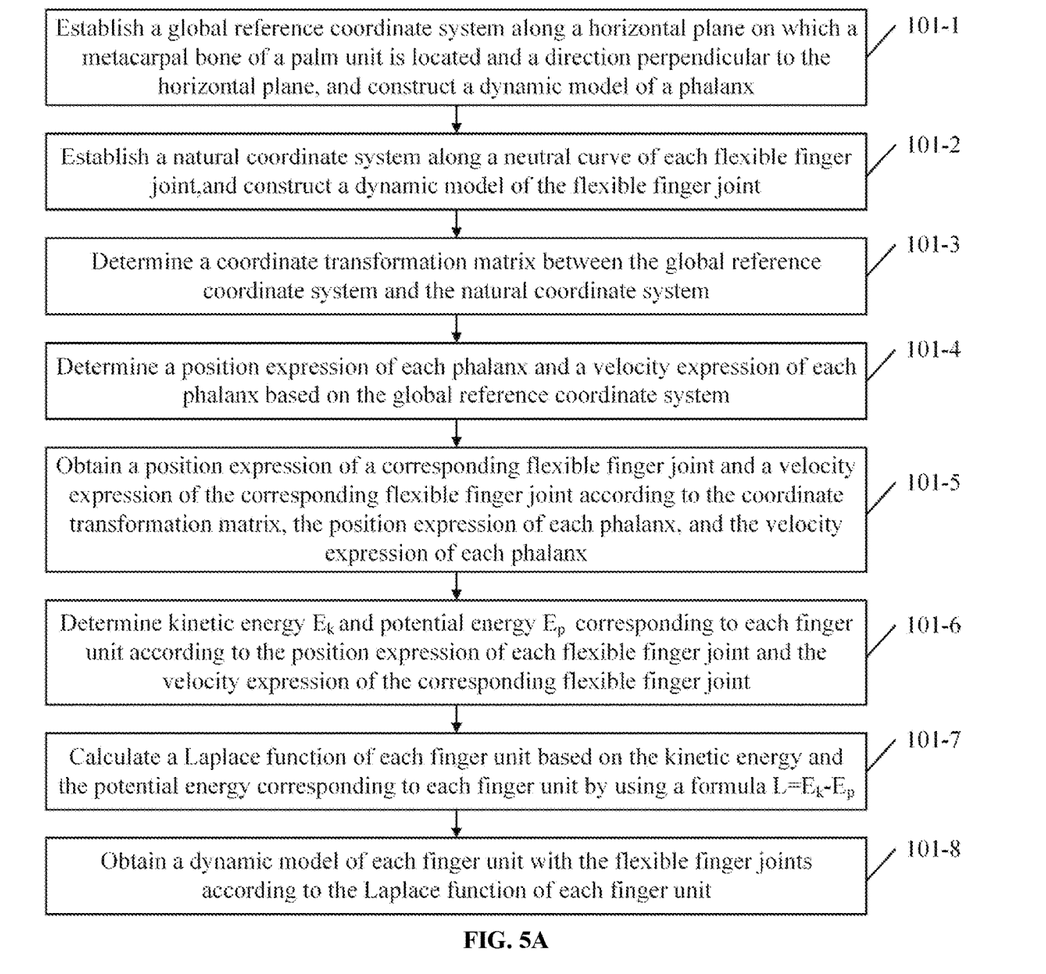
FIG. 5A shows the steps included in step 101 of FIG. 5.

Step 101: Establish a dynamic model of a finger unity. Step 101 specifically includes the following steps 101-1 to 101-8 as shown in FIG. 5A.

Step 101-1: Establish a global reference coordinate system along a horizontal plane on which a metacarpal bone of a palm unit is located and a direction perpendicular to the horizontal plane, and construct a dynamic model of a phalange.

Step 101-2: Establish a natural coordinate system along a neutral curve of each flexible finger joint, and construct a dynamic model of the flexible finger joint.

Step 101-3: Determine a coordinate transformation matrix between the global reference coordinate system and the natural coordinate system, where the coordinate transformation matrix between the two coordinate systems is:

$$R = \begin{bmatrix} \cos\theta_i & -\sin\theta_i \\ \sin\theta_i & \cos\theta_i \end{bmatrix}$$

where $\theta_i$ is a bending angle of the $i^{th}$ flexible finger joint.

Step 101-4: Determine a position expression of each phalange and a velocity expression of each phalange based on the global reference coordinate system.

Step 101-5: Obtain a position expression of a corresponding flexible finger joint and a velocity expression of the corresponding flexible finger joint according to the coordinate transformation matrix, the position expression of each phalange, and the velocity expression of each phalange.

Step 101-6: Determine kinetic energy $E_k$ and potential energy $E_p$ corresponding to each finger unit according to the position expression of each flexible finger joint and the velocity expression of the corresponding flexible finger joint.

Step 101-7: Calculate a Laplace function of each finger unit based on the kinetic energy and the potential energy corresponding to each finger unit by using a formula $L=E_k-E_p$.

Step 101-8: Obtain a dynamic model of each finger unit with the flexible finger joints according to the Laplace function of each finger unit, which specifically includes:

obtaining a motion equation of each finger unit according to the Laplace function of each finger unit by using a Lagrangian formula, where specifically, the motion equation of each finger unit can be expressed as follows according to the Lagrangian formula:

$$\frac{d}{dt}\left[\frac{\partial L}{\partial \dot{\theta}_i}\right] - \left[\frac{\partial L}{\partial \theta_i}\right] = \tau_i$$

where $\tau_i \in R^P$ represents an input or a control torque of the $i^{th}$ flexible finger joint; $\theta_i$ represents a bending angle of the $i^{th}$ flexible finger joint; L represents the Laplace function of the finger unit; and t represents time; and obtaining the dynamic model of each finger unit with flexible finger joints according to the motion equation of each finger unit, where specifically, the dynamic model of each finger unit with flexible finger joints may be described as follows:

$$M(q_i)\ddot{q}_i + C(q_i,\dot{q}_i)\dot{q}_i + g(q_i) = \tau_i, \quad i=1,2$$

where $q_i \in R^P$ represents a generalized coordinate vector of the $i^{th}$ flexible finger joint; $C(q_i,\dot{q}_i) \in R^{p \times p}$ represents a symmetrical inertia matrix of the $i^{th}$ flexible finger joint; $M(q_i) \in R^{n \times n}$ represents a Coriolis torque of the $i^{th}$ flexible finger joint; $g(\theta_i)$ represents a generalized potential torque of the $i^{th}$ flexible finger joint; and $\tau_i \in R^P$ represents an input or a control torque of the $i^{th}$ flexible finger joint.

Step 102: Design a sliding mode control rate according to the dynamic model and Lyapunov function stability theory.

In trajectory tracking control of the gripper with flexible finger joints, sliding mode control is used to design a sliding mode surface:

$$s = \dot{e} + \lambda e$$

s is the designed sliding mode surface, e is a trajectory tracking error, a value of $\lambda$ can adjust a speed at which the trajectory tracking error approaches 0. Then the dynamic model of the finger unit in step 1018 is used to design the following sliding mode control rate based on the Lyapunov function stability:

$$\tau = M_0(\ddot{q}_d + \lambda\dot{e}) + C_0(\dot{q}_d + \lambda e) + \Gamma \text{sgn}(s)$$

where $M_0$ and $C_0$ are nominal values of M and C respectively, M is a Coriolis torque, C is a symmetrical inertia matrix, $\lambda$ is a real number, and a value of $\lambda$ can adjust a speed at which a trajectory tracking error approaches 0, e is the trajectory tracking error, $q_d$ is an expected position, sgn(s) is a symbolic function, and $\Gamma$ is a real number.

Let $\Gamma=\text{diag}(\gamma_1, \gamma_2, \ldots, \gamma_n)$, $(\gamma_i>0)$. According to the Lyapunov function stability theory, to make the system stable, then:

$$\gamma_i > |dC|_{max}|\dot{q}_d + \lambda e| + |dM|_{max}|\ddot{q}_d + \lambda \dot{e}|$$

where $dM=M-M_0$, $dC=C-C_0$, M is the Coriolis torque, C is the symmetrical inertia matrix, $M_0$ and $C_0$ are nominal values of M and C respectively, $\lambda$ is a real number, and a value of $\lambda$ can adjust a speed at which a trajectory tracking error approaches 0, e is the trajectory tracking error, $q_d$ is an expected position, and $\gamma_i$ is a real number.

Step 103: Control a bending angle of each flexible finger joint based on the sliding mode control rate to implement trajectory tracking control.

The designed sliding mode control rate is used to control each finger unit so that bending angles of its flexible finger joints change along a desired angle, thereby implementing trajectory tracking control. A final goal achieved by the control may be expressed as: $s \to 0$.

Figure 6:
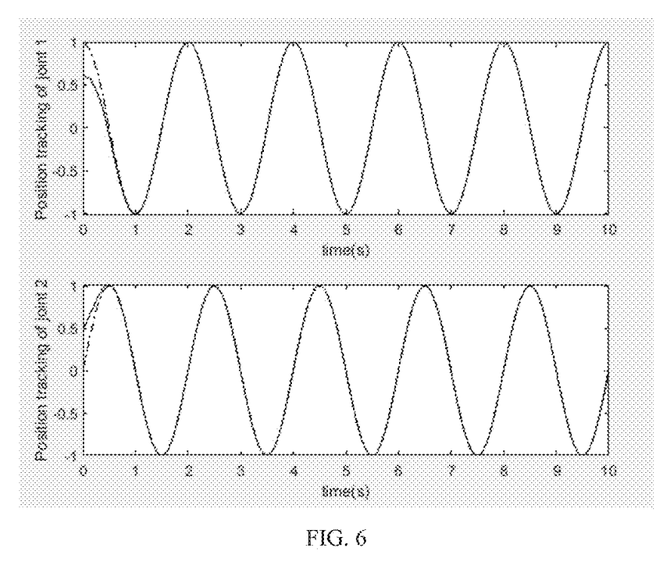
FIG. 6 is a simulation diagram of trajectory tracking of two flexible finger joints on a finger unit used in the present disclosure.
Figure 7:
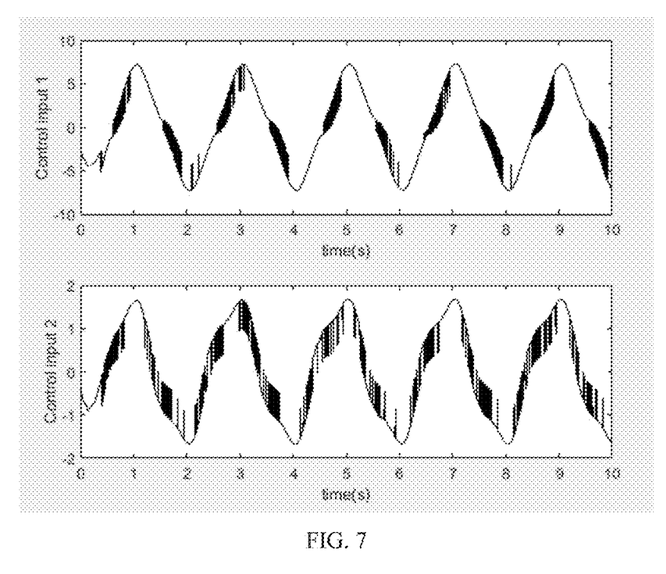
FIG. 7 is a simulation diagram of trajectory tracking errors of two flexible finger joints on a finger unit used in the present disclosure.
Figure 8:
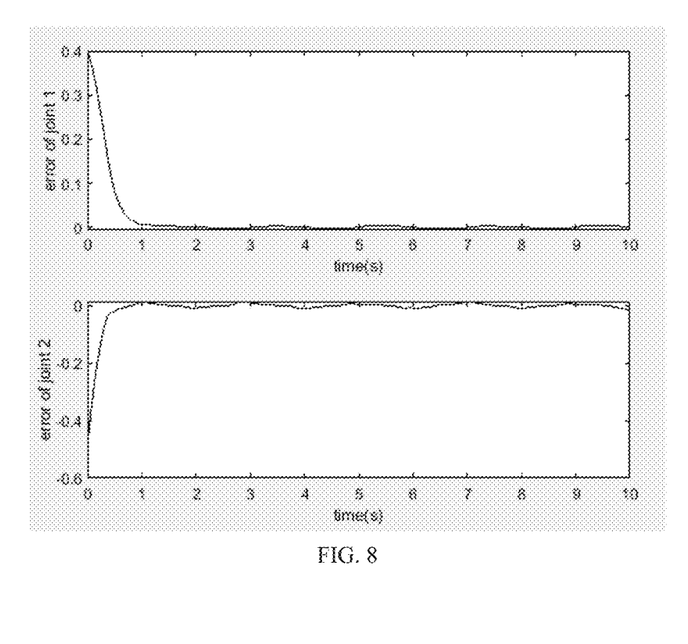
FIG. 8 is a diagram showing changes of input torques for bending control of two flexible finger joints on a finger unit used in the present disclosure.

FIGS. 6-8 show simulation implementation of the trajectory tracking control of the gripper with flexible finger joints. Specifically, FIG. 6 is a simulation diagram of trajectory tracking of two flexible finger joints on a finger unit used in the present disclosure. FIG. 7 is a simulation diagram of trajectory tracking errors of two flexible finger joints on a finger unit used in the present disclosure. FIG. 8 is a diagram showing changes of input torques for bending control of two flexible finger joints on a finger unit used in the present disclosure.

The present disclosure applies the idea and method of sliding mode control to a 4D printing intelligent structure, tests the feasibility of the mentioned sliding mode control rate for trajectory tracking through specific simulation experiments, and applies a control algorithm to one finger unit of the 4D printed gripper system with flexible finger joints. The finger unit includes two flexible finger joints and two phalanges, and expected trajectories of the two flexible finger joints are preset as $\sin(\pi)$ and $\cos(\pi)$. FIG. 6 is a simulation diagram of trajectory tracking of two flexible finger joints on a finger unit used in the present disclosure. In FIG. 6, a dashed-dotted line represents an expected trajectory of the flexible finger joint, and a solid line represents a tracking trajectory of the flexible finger joint. A simulation result shows that a trajectory at a first flexible finger joint is close to the expected trajectory after 1 s, and a trajectory at a second flexible finger joint is close to the expected trajectory after 0.6 s. FIG. 7 is a simulation diagram of trajectory tracking errors of two flexible finger joints on a finger unit used in the present disclosure. FIG. 8 is a diagram showing changes of input torques for bending control of two flexible finger joints on a finger unit used in the present disclosure. According to a relationship equation between a control input torques and a position of the flexible finger joint, the gripper with flexible finger joints can be controlled to implement trajectory tracking. Simulation results show the effectiveness of the trajectory tracking control method of the gripper with flexible finger joints.

While the embodiments of the present disclosure are described in detail above with reference to the accompanying drawings, the present disclosure is not limited to the described embodiments, and various variations can be made by those of ordinary skill in the art in the context of their knowledge without departing from the spirit of the present disclosure.

What is claimed is:

1. A 4D printed gripper with flexible finger joints, comprising: a palm unit and five finger units connected to the palm unit, wherein each finger unit comprises two flexible finger joints and two phalanges; each flexible finger joint is divided into one upper layer and one lower layer of liquid crystal elastomer (LCE), and each LCE is used to implement a bidirectional bending movement of the finger unit.

2. The 4D printed gripper with flexible finger joints according to claim 1, wherein the palm unit is made by 3D printing.

3. The 4D printed gripper with flexible finger joints according to claim 1, wherein printing materials of the flexible finger joints of all finger units are the same, and printing materials of the phalanges of all finger units are the same, the flexible finger joints are separately connected to the palm unit and the phalanges, the phalanges are made of a fixed hard material, and the hard material moves with the bending of the flexible finger joints.

4. The 4D printed gripper with flexible finger joints according to claim 1, wherein each phalanx is made of a resin material by 3D printing; and each flexible finger joint is made of a 4D printed LCE composite material.

5. The 4D printed gripper with flexible finger joints according to claim 1, wherein a bending curvature detection sensor and a polyimide electrothermal film are attached to a surface of each LCE; the bending curvature detection sensor is used to monitor a bending angle of the flexible finger joint; and when an electric current is applied, the polyimide electrothermal film generates heat, so that the LCE is heated and deformed.

6. The 4D printed gripper with flexible finger joints according to claim 1, wherein when the flexible finger joint is energized and heated externally, one layer of LCE contracts, the other layer of LCE expands, and the finger unit bends to a contracted side; and when the power is off, the finger unit returns to an original state.

7. A trajectory tracking control method for a 4D printed gripper with flexible finger joints, wherein the method is applied to the 4D printed gripper with flexible finger joints according to claim 1, and the method comprises:
establishing a dynamic model of a finger unit;
designing a sliding mode control rate according to the dynamic model and Lyapunov function stability theory; and
controlling a bending angle of each flexible finger joint based on the sliding mode control rate to implement trajectory tracking control.

8. The trajectory tracking control method for a 4D printed gripper with flexible finger joints according to claim 7, wherein the palm unit is made by 3D printing.

9. The trajectory tracking control method for a 4D printed gripper with flexible finger joints according to claim 8, wherein the establishing a dynamic model of a finger unit specifically comprises:
establishing a global reference coordinate system along a horizontal plane on which a metacarpal bone of a palm unit is located and a direction perpendicular to the horizontal plane, and constructing a dynamic model of a phalanx;

establishing a natural coordinate system along a neutral curve of each flexible finger joint, and constructing a dynamic model of the flexible finger joint;

determining a coordinate transformation matrix between the global reference coordinate system and the natural coordinate system;

determining a position expression of each phalanx and a velocity expression of each phalanx based on the global reference coordinate system;

obtaining a position expression of a corresponding flexible finger joint and a velocity expression of the corresponding flexible finger joint according to the coordinate transformation matrix, the position expression of each phalanx, and the velocity expression of each phalanx;

determining kinetic energy $E_k$ and potential energy $E_p$ corresponding to each finger unit according to the position expression of each flexible finger joint and the velocity expression of the corresponding flexible finger joint;

calculating a Laplace function of each finger unit based on the kinetic energy and the potential energy corresponding to each finger unit by using a formula $L=E_k-E_p$; and obtaining a dynamic model of each finger unit with the flexible finger joints according to the Laplace function of the finger unit.

10. The trajectory tracking control method for a 4D printed gripper with flexible finger joints according to claim 8, wherein the obtaining a dynamic model of each finger unit with the flexible finger joints according to the Laplace function of the finger unit specifically comprises:

obtaining a motion equation of each finger unit according to the Laplace function of each finger unit by using a Lagrangian formula; and obtaining the dynamic model of each finger unit with flexible finger joints according to the motion equation of each finger unit.

11. The trajectory tracking control method for a 4D printed gripper with flexible finger joints according to claim 7, wherein printing materials of the flexible finger joints of all finger units are the same, and printing materials of the phalanges of all finger units are the same, the flexible finger joints are separately connected to the palm unit and the phalanges, the phalanges are made of a fixed hard material, and the hard material moves with the bending of the flexible finger joints.

12. The trajectory tracking control method for a 4D printed gripper with flexible finger joints according to claim 11, wherein the establishing a dynamic model of a finger unit specifically comprises:

establishing a global reference coordinate system along a horizontal plane on which a metacarpal bone of a palm unit is located and a direction perpendicular to the horizontal plane, and constructing a dynamic model of a phalanx;

establishing a natural coordinate system along a neutral curve of each flexible finger joint, and constructing a dynamic model of the flexible finger joint;

determining a coordinate transformation matrix between the global reference coordinate system and the natural coordinate system;

determining a position expression of each phalanx and a velocity expression of each phalanx based on the global reference coordinate system;

obtaining a position expression of a corresponding flexible finger joint and a velocity expression of the corresponding flexible finger joint according to the coordinate transformation matrix, the position expression of each phalanx, and the velocity expression of each phalanx;

determining kinetic energy $E_k$ and potential energy $E_p$ corresponding to each finger unit according to the position expression of each flexible finger joint and the velocity expression of the corresponding flexible finger joint;

calculating a Laplace function of each finger unit based on the kinetic energy and the potential energy corresponding to each finger unit by using a formula $L=E_k-E_p$; and obtaining a dynamic model of each finger unit with the flexible finger joints according to the Laplace function of the finger unit.

13. The trajectory tracking control method for a 4D printed gripper with flexible finger joints according to claim 11, wherein the obtaining a dynamic model of each finger unit with the flexible finger joints according to the Laplace function of the finger unit specifically comprises:

obtaining a motion equation of each finger unit according to the Laplace function of each finger unit by using a Lagrangian formula; and obtaining the dynamic model of each finger unit with flexible finger joints according to the motion equation of each finger unit.

14. The trajectory tracking control method for a 4D printed gripper with flexible finger joints according to claim 7, wherein each phalanx is made of a resin material by 3D printing; and each flexible finger joint is made of a 4D printed LCE composite material.

15. The trajectory tracking control method for a 4D printed gripper with flexible finger joints according to claim 14, wherein the establishing a dynamic model of a finger unit specifically comprises:

establishing a global reference coordinate system along a horizontal plane on which a metacarpal bone of a palm unit is located and a direction perpendicular to the horizontal plane, and constructing a dynamic model of a phalanx;

establishing a natural coordinate system along a neutral curve of each flexible finger joint, and constructing a dynamic model of the flexible finger joint;

determining a coordinate transformation matrix between the global reference coordinate system and the natural coordinate system;

determining a position expression of each phalanx and a velocity expression of each phalanx based on the global reference coordinate system;

obtaining a position expression of a corresponding flexible finger joint and a velocity expression of the corresponding flexible finger joint according to the coordinate transformation matrix, the position expression of each phalanx, and the velocity expression of each phalanx;

determining kinetic energy $E_k$ and potential energy $E_p$ corresponding to each finger unit according to the position expression of each flexible finger joint and the velocity expression of the corresponding flexible finger joint;

calculating a Laplace function of each finger unit based on the kinetic energy and the potential energy corresponding to each finger unit by using a formula $L=E_k-E_p$; and obtaining a dynamic model of each finger unit with the flexible finger joints according to the Laplace function of the finger unit.

16. The trajectory tracking control method for a 4D printed gripper with flexible finger joints according to claim 7, wherein a bending curvature detection sensor and a polyimide electrothermal film are attached to a surface of each LCE; the bending curvature detection sensor is used to monitor a bending angle of the flexible finger joint; and when an electric current is applied, the polyimide electrothermal film generates heat, so that the LCE is heated and deformed.

17. The trajectory tracking control method for a 4D printed gripper with flexible finger joints according to claim 16, wherein the establishing a dynamic model of a finger unit specifically comprises:
  establishing a global reference coordinate system along a horizontal plane on which a metacarpal bone of a palm unit is located and a direction perpendicular to the horizontal plane, and constructing a dynamic model of a phalanx;
  establishing a natural coordinate system along a neutral curve of each flexible finger joint, and constructing a dynamic model of the flexible finger joint;
  determining a coordinate transformation matrix between the global reference coordinate system and the natural coordinate system;
  determining a position expression of each phalanx and a velocity expression of each phalanx based on the global reference coordinate system;
  obtaining a position expression of a corresponding flexible finger joint and a velocity expression of the corresponding flexible finger joint according to the coordinate transformation matrix, the position expression of each phalanx, and the velocity expression of each phalanx;
  determining kinetic energy $E_k$ and potential energy $E_p$ corresponding to each finger unit according to the position expression of each flexible finger joint and the velocity expression of the corresponding flexible finger joint;
  calculating a Laplace function of each finger unit based on the kinetic energy and the potential energy corresponding to each finger unit by using a formula $L=E_k-E_p$; and
  obtaining a dynamic model of each finger unit with the flexible finger joints according to the Laplace function of the finger unit.

18. The trajectory tracking control method for a 4D printed gripper with flexible finger joints according to claim 7, wherein when the flexible finger joint is energized and heated externally, one layer of LCE contracts, the other layer of LCE expands, and the finger unit bends to a contracted side; and when the power is off, the finger unit returns to an original state.

19. The trajectory tracking control method for a 4D printed gripper with flexible finger joints according to claim 18, wherein the establishing a dynamic model of a finger unit specifically comprises:
  establishing a global reference coordinate system along a horizontal plane on which a metacarpal bone of a palm unit is located and a direction perpendicular to the horizontal plane, and constructing a dynamic model of a phalanx;
  establishing a natural coordinate system along a neutral curve of each flexible finger joint, and constructing a dynamic model of the flexible finger joint;
  determining a coordinate transformation matrix between the global reference coordinate system and the natural coordinate system;
  determining a position expression of each phalanx and a velocity expression of each phalanx based on the global reference coordinate system;
  obtaining a position expression of a corresponding flexible finger joint and a velocity expression of the corresponding flexible finger joint according to the coordinate transformation matrix, the position expression of each phalanx, and the velocity expression of each phalanx;
  determining kinetic energy $E_k$ and potential energy $E_p$ corresponding to each finger unit according to the position expression of each flexible finger joint and the velocity expression of the corresponding flexible finger joint;
  calculating a Laplace function of each finger unit based on the kinetic energy and the potential energy corresponding to each finger unit by using a formula $L=E_k-E_p$; and
  obtaining a dynamic model of each finger unit with the flexible finger joints according to the Laplace function of the finger unit.

20. The trajectory tracking control method for a 4D printed gripper with flexible finger joints according to claim 7, wherein the establishing a dynamic model of a finger unit specifically comprises:
  establishing a global reference coordinate system along a horizontal plane on which a metacarpal bone of a palm unit is located and a direction perpendicular to the horizontal plane, and constructing a dynamic model of a phalanx;
  establishing a natural coordinate system along a neutral curve of each flexible finger joint, and constructing a dynamic model of the flexible finger joint;
  determining a coordinate transformation matrix between the global reference coordinate system and the natural coordinate system;
  determining a position expression of each phalanx and a velocity expression of each phalanx based on the global reference coordinate system;
  obtaining a position expression of a corresponding flexible finger joint and a velocity expression of the corresponding flexible finger joint according to the coordinate transformation matrix, the position expression of each phalanx, and the velocity expression of each phalanx;
  determining kinetic energy $E_k$ and potential energy $E_p$ corresponding to each finger unit according to the position expression of each flexible finger joint and the velocity expression of the corresponding flexible finger joint;
  calculating a Laplace function of each finger unit based on the kinetic energy and the potential energy corresponding to each finger unit by using a formula $L=E_k-E_p$; and
  obtaining a dynamic model of each finger unit with the flexible finger joints according to the Laplace function of the finger unit.

* * * * *